United States Patent
Dao et al.

(10) Patent No.: US 7,367,766 B2
(45) Date of Patent: May 6, 2008

(54) SCREW AND NUT FASTENING DEVICE

(75) Inventors: Daniel Dao, Savigny le Temple (FR); Eric Landragin, Paris (FR); Francois Garcin, Paris (FR)

(73) Assignee: SNECMA, Paris (FR)

( * ) Notice: Subject to any disclaimer, the term of this patent is extended or adjusted under 35 U.S.C. 154(b) by 680 days.

(21) Appl. No.: 10/872,433

(22) Filed: Jun. 22, 2004

(65) Prior Publication Data

US 2005/0020367 A1 Jan. 27, 2005

(30) Foreign Application Priority Data

Jun. 26, 2003 (FR) ................... 03 07708

(51) Int. Cl.
*F16B 39/02* (2006.01)
*F16B 39/10* (2006.01)

(52) U.S. Cl. ............. 411/92; 411/88; 411/90; 411/93; 411/119; 81/55

(58) Field of Classification Search ............. 411/88–94, 411/119; 81/55, 57.16, 57.23
See application file for complete search history.

(56) References Cited

U.S. PATENT DOCUMENTS

| | | | | |
|---|---|---|---|---|
| 312,555 A * | 2/1885 | Crocker | ................ | 411/97 |
| 476,753 A * | 6/1892 | Lewis | ................ | 238/226 |
| 711,776 A * | 10/1902 | Lieske | ................ | 238/191 |
| 720,769 A * | 2/1903 | Woodworth | ................ | 411/97 |
| 766,710 A * | 8/1904 | Lieske | ................ | 238/191 |
| 1,228,462 A * | 6/1917 | Marks | ................ | 238/262 |
| 1,357,370 A * | 11/1920 | Williams | ................ | 238/262 |
| 1,389,006 A * | 8/1921 | Noah | ................ | 411/92 |
| 2,163,152 A * | 6/1939 | Palm | ................ | 192/70.14 |
| 2,537,527 A * | 1/1951 | Heckert | ................ | 411/92 |
| 2,626,837 A * | 1/1953 | Wilson et al. | ................ | 301/35.624 |
| 3,008,554 A * | 11/1961 | Hodgson | ................ | 403/21 |
| 3,037,860 A * | 6/1962 | Masterson et al. | ................ | 419/6 |
| 3,378,288 A * | 4/1968 | Kanas | ................ | 411/116 |
| 3,490,508 A * | 1/1970 | Nelson | ................ | 411/97 |
| 4,737,057 A * | 4/1988 | Olsson | ................ | 411/92 |
| 4,830,164 A * | 5/1989 | Hays | ................ | 192/107 R |
| 5,630,703 A * | 5/1997 | Hendley et al. | ................ | 416/95 |
| 5,826,682 A * | 10/1998 | Goettker | ................ | 188/72.4 |
| 6,682,077 B1* | 1/2004 | Letourneau | ................ | 277/412 |
| 6,793,057 B1* | 9/2004 | Smith, Jr. | ................ | 192/70.14 |
| 6,974,275 B2* | 12/2005 | Nago et al. | ................ | 403/21 |
| 7,004,277 B2* | 2/2006 | Pollock et al. | ................ | 180/346 |
| 7,007,386 B1* | 3/2006 | Stover | ................ | 29/898.07 |
| 2002/0125353 A1* | 9/2002 | Bardos et al. | ................ | 241/30 |
| 2005/0020367 A1* | 1/2005 | Dao et al. | ................ | 470/2 |

FOREIGN PATENT DOCUMENTS

| | | |
|---|---|---|
| FR | 674 376 | 1/1930 |
| FR | 2 502 690 | 10/1982 |
| FR | 2 715 975 | 8/1995 |

* cited by examiner

*Primary Examiner*—Katherine Mitchell
(74) *Attorney, Agent, or Firm*—Oblon, Spivak, McClelland, Maier & Neustadt, P.C.

(57) ABSTRACT

A device for fastening two parts to each other includes fastening screws extending in aligned passages in the two parts and receiving nuts, and a removable element for preventing the screw heads from moving during tightening or loosening of the nuts on the screws, this removable element cooperating with one of the two parts for preventing rotation of the screw heads relative to this part.

14 Claims, 4 Drawing Sheets

SCREW AND NUT FASTENING DEVICE

The present invention relates to a device for using screws and nuts to fasten two parts to each other.

BACKGROUND OF THE INVENTION

Such screw-and-nut fastening devices serve in particular to assemble together two or more separable parts, and they are very widespread in a variety of applications in all technical fields. To perform the operations of tightening and loosening a nut on a screw, it is necessary to prevent the screw from moving in rotation and in translation so as to ensure that it cannot turn freely, thereby failing to provide torque opposing the tightening or loosening torque exerted on the nut by some appropriate tool, such as, for example, a wrench or an automatic or semiautomatic screw-tightening machine.

When such devices are used for assembling together annular elements of a turbomachine rotor, a solution described in documents FR-A-2 502 690 and FR-A-2 715 975 consists in preventing the screws from moving in rotation and in translation by providing housings by machining or any other suitable manufacturing methods, and more particularly by providing recesses in one of the annular parts for fastening together, for the purpose of receiving screw heads shaped to co-operate with the recesses so as to prevent the screws from moving.

Nevertheless, because of the particular shape and the dimensional and positioning tolerances on the recesses, the corresponding machining is difficult and expensive to perform, particularly when the part in question is bulky, and of complex shape requiring very great precautions to be taken during handling or while performing machining operations. In addition, when the mechanical stress is applied to the part, the recesses can lead to stresses becoming concentrated within the part, thereby weakening it. To increase the strength of the part in the vicinity of such recesses, and thereby increase its lifetime, it is common to reinforce the part by adding material around the recesses, thereby ending up with an increase in the weight of the assembly. This extra weight can become a non-negligible drawback, for example in the field of aviation where it is desirable to reduce the weight of all on-board parts, or where the part is a moving part, e.g. an element of a turbocompressor or turbojet rotor, in which case it is desirable to reduce its inertia.

Another drawback of such recesses for preventing screw heads from moving is that their walls are subjected directly to the tightening torque exerted on the nut, and if that should exceed a predetermined limiting value, that can mark or even damage the part in which the recesses are formed.

OBJECTS AND SUMMARY OF THE INVENTION

An object of the invention is to avoid the above-mentioned drawbacks and to provide a solution that is technically simple and inexpensive, for effectively preventing fastening screws from moving while two parts are being assembled together.

To this end, the invention provides a device for fastening two parts together, the device comprising fastening screws having heads, and means for preventing the screw heads from moving, the fastening screws extending along aligned passages in the two parts with their heads being pressed against one of the parts and receiving nuts pressed against the other one of the parts, wherein the means for preventing the screw heads from moving comprise at least one removable element including means for preventing rotation relative to one of the two parts for fastening together.

Transposing the means for preventing the screw heads from moving onto an independent element makes it possible to avoid weakening the parts for fastening together by forming recesses therein, and consequently preserves said parts from the marking and damage that they can suffer due to the forces exerted during screw tightening by the screw heads acting on the means for preventing them from moving. In addition, since the removable element(s) is/are intended solely for the purpose of preventing screw heads from moving during assembly, they can be very simple in general shape and quite compact, thus making them easy to handle and easy to manufacture while also reducing their cost. The removable element of the invention can be used many times over and it can easily be replaced if it becomes worn or abnormally damaged, without any financial consequence.

While nuts are being tightened onto the screws, the screw heads exert torque on the removable element that tends to cause it to move in rotation: by providing means that prevent movement in rotation and that are formed on the removable element, movement in rotation of said element relative to one of the parts for fastening together can be prevented without it being necessary to apply additional anti-rotation tooling to the removable element, thus making the fastening device of the invention simpler and faster to implement.

Advantageously, the removable element is prevented from moving in rotation by coming into abutment against a portion of one of the parts for fastening together. Preventing movement by abutment enables the anti-rotation function of the removable element to be implemented simply and effectively against one of the parts for fastening together. In particular, the large area of contact and any possible hardening treatment make it possible to obtain an abutment that is very rigid and very strong.

Another advantageous characteristic of the invention consists in preventing the removable element from moving in rotation merely by engaging said removable element on at least two adjacent screws for fastening the two parts together.

Advantageously, the or each removable element includes, formed in one of its rims, at least one recess for engagement on a screw head. The recess is U-shaped, it is easily made by machining, and its shape is complementary to that of the head of the screw that is to be prevented from moving, which screw may be a standard screw having a head of square section, for example, that does not need to be machined.

In a preferred embodiment of the invention, the or each removable element is of L-shaped section, having one limb forming a rim that includes one or more of the above-mentioned recesses and having its other limb forming an abutment against one of the parts for fastening together, thereby defining a position in which the or each recess is engaged on a screw head. While the removable element is being engaged on the screw head, abutment makes it possible immediately and without possible error to find the position in which the screw heads and the removable element are prevented from moving in rotation on one of the parts for fastening together. This particular L-shape of the removable element makes it possible to group together all of the means needed for preventing the screw heads from moving in a manner that is effective and simple.

In practice, movement in translation perpendicular to the axes of the screws suffices to engage the removable element on the screw heads so as to prevent them from moving in rotation.

Advantageously, when the parts for assembling together are annular, the device comprises a plurality of independent removable elements distributed around a circumference. Each of the independent elements may be very simple in shape and very small in size, and consequently is easy to make and above all easy to handle, thereby considerably simplifying implementation of the device of the invention.

According to other characteristics of the invention:

the or each removable element includes, formed in one of its rims, at least two recesses for engaging on screw heads;

the above-mentioned abutment-forming limb also forms the means for preventing the removable element from moving in rotation;

the or each recess is open firstly to the end surface of the rim remote from the abutment-forming limb and secondly to the side surface of the rim beside the abutment-forming limb;

the or each engagement recess is closed beside the side surface of the rim that faces away from the limb forming a positioning abutment, so as to form an axial abutment capable of coming into contact with a screw head;

the or each engagement recess is a notch extending from the free end of the rim in which it is formed.

In preferred applications of the invention:

the two parts are annular parts, in particular for turbomachine rotors;

at least one of the two above-mentioned annular parts is a rotor disk.

BRIEF DESCRIPTION OF THE DRAWINGS

The invention will be better understood and other characteristics, details, and advantages thereof will appear more clearly on reading the following description made by way of example and with reference to the accompanying drawings in which.

MORE DETAILED DESCRIPTION

Figure 1:
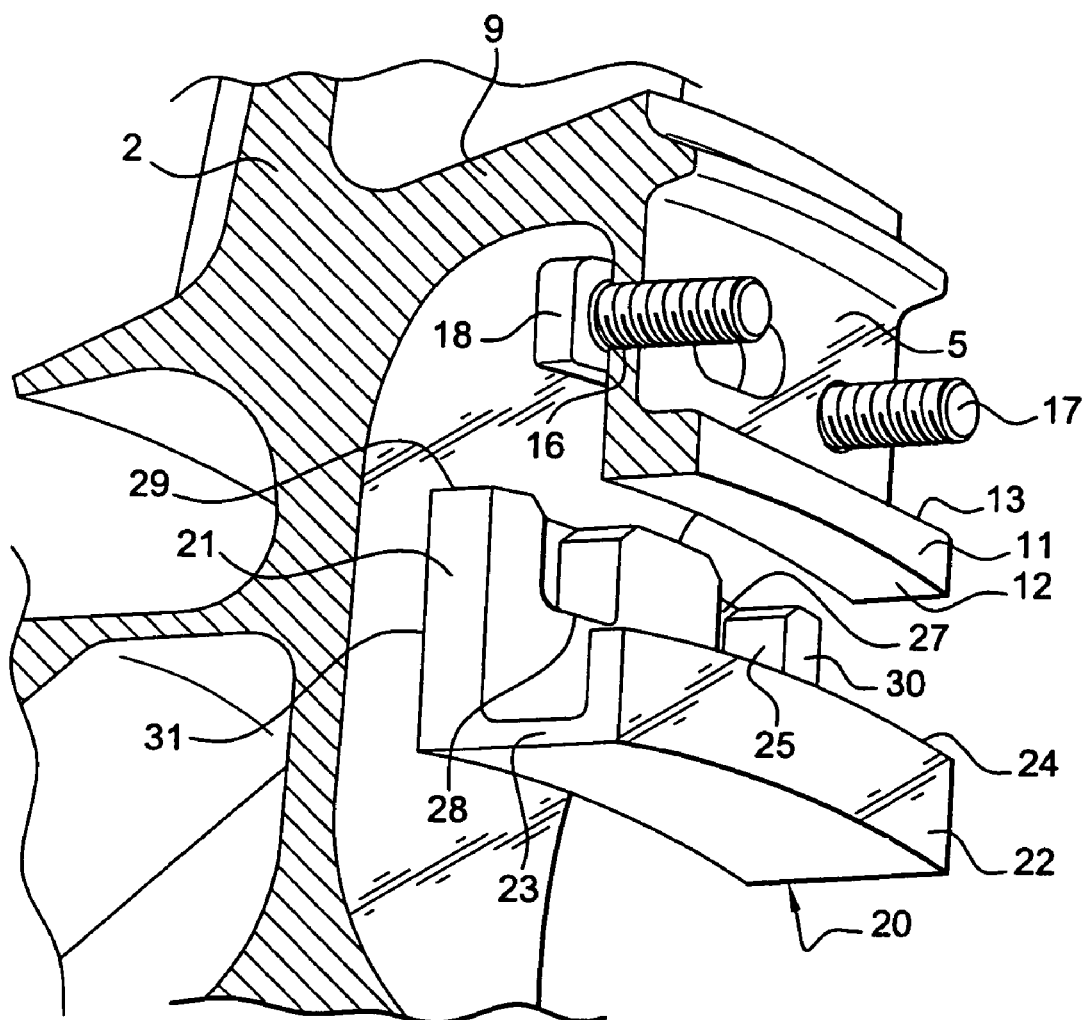
FIG. 1 highly diagrammatic perspective view of an embodiment of the device of the invention showing a first step of fastening two parts together.

The device of the invention in this example is used to assemble together two annular parts 2 and 3 of a rotor of a turbocompressor. The first of these parts is a rotor disk 2 and the second is an annular part forming a spacer 3 and including in particular collars 4 for co-operating with stator vanes (not shown) so as to form a baffle seal. The two annular elements 2 and 3 are placed axially end to end and comprise respectively an annular flange 5 and flange-connection tabs 6 (see FIGS. 3 and 4) that extend radially inwards. A cylindrical wall 9 carrying the annular flange 5 extends from the rotor disk 2 around the axis 26 (FIG. 3), and a cylindrical wall 10 carrying the tabs 6 extends from the spacer part 3. Although FIGS. 1 to 4 show only an annular sector of the two annular parts 2, 3, the tabs 6 are regularly distributed around the entire radially inner periphery of the cylindrical wall 10. An annular rim 11 (FIGS. 1 and 4) is formed on the radially inner periphery 12 of the annular flange 5 and projects towards the spacer 3. The tabs 6 extend radially to the vicinity of the annular rim 11, while ensuring that clearance is left between the free ends of the tabs 6 and the annular rim 11 (FIG. 4).

Screw passages 16, 15 are regularly distributed on a circumference firstly through the annular flange 5 and secondly through the various tabs 6. The screw passages 15 formed in the tabs 6 are in alignment with the passages 16 in the annular flange 5 and they are intended to receive standard fixing screws 17 having square heads 18 which are applied against the annular flange 5 on its side facing away from the spacer 3. Nuts 19 are screwed onto the threaded shanks of the screws 17 so as to press against the tabs 6 on their sides facing away from the rotor disk 2.

The means for preventing the heads of two screws from moving as shown in the drawings comprise a removable element 20 substantially in the form of an annular sector and comprising two parallel walls 21 and 22 interconnected by a third wall 23 that is perpendicular to the first two walls, this third wall 23 forming a portion of a cylinder. The first wall 21 and the third wall 23 give the section of the removable element 20 a general L-shape. Substantially square or rectangular recesses 25 of shape complementary to the square shape of the screw heads 18 are formed in the first side wall 21 and open out radially into the end surface 29 of the wall 21 remote from the wall 23, and axially into the side surface 30 of the wall 21 that faces towards the second wall 22. These recesses are closed beside the side surface 31 of the wall 21 that faces away from the second wall 22 so as to constitute axial abutments 27 for respective screw heads 18.

Figure 2:
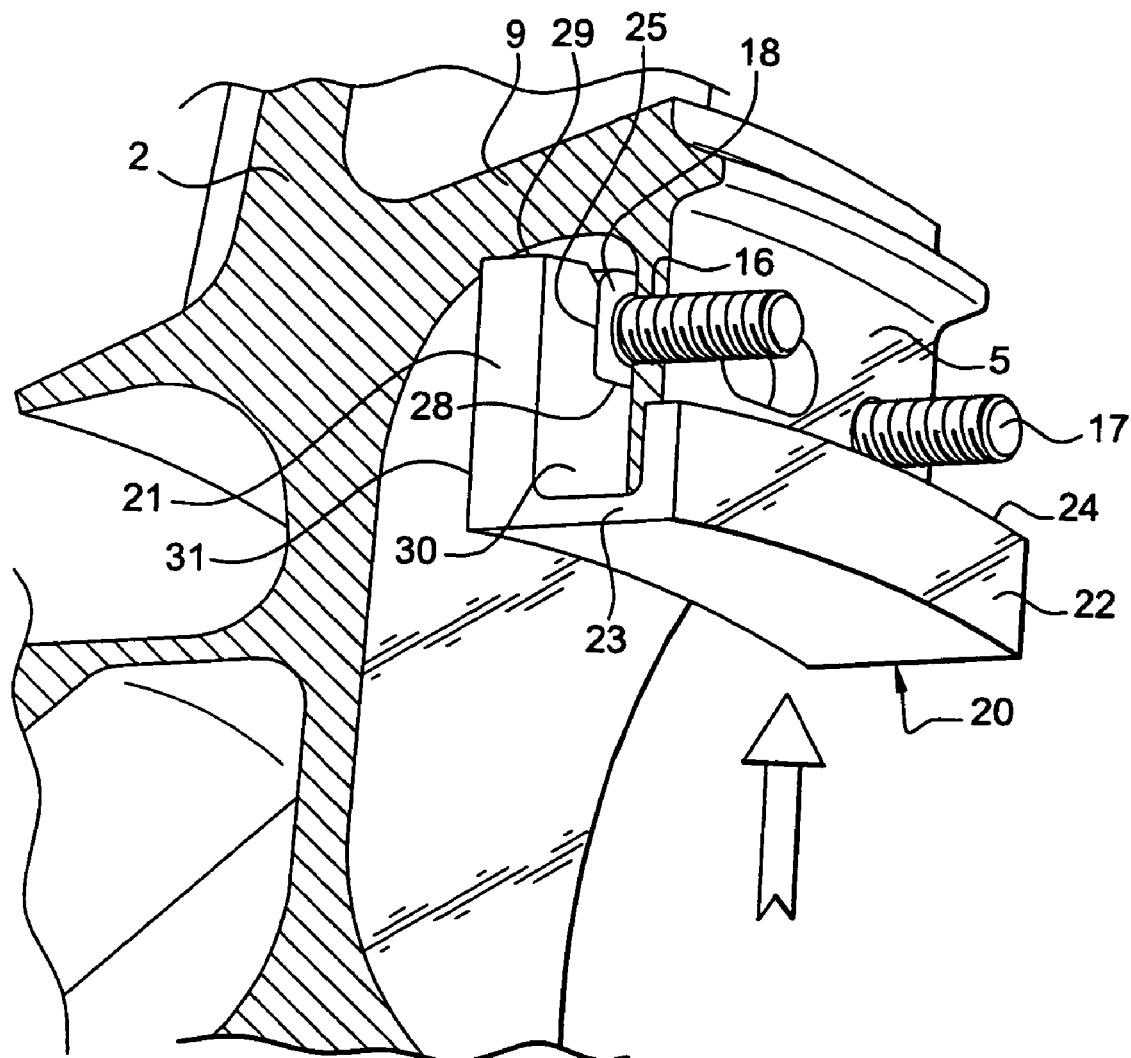
FIG. 2 is a highly diagrammatic perspective view of the embodiment of FIG. 1 showing a second step of fastening the two parts together.
Figure 3:
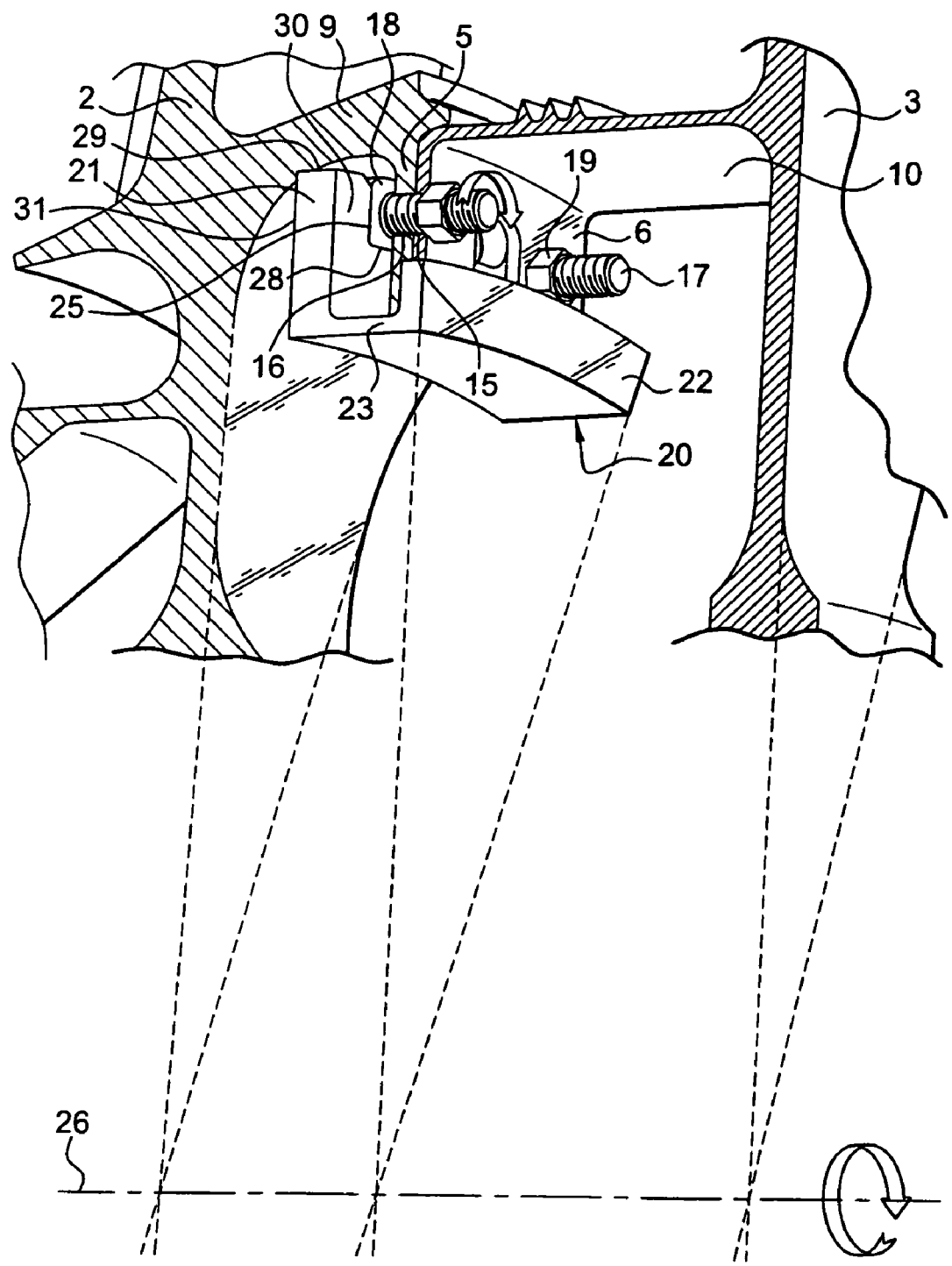
FIG. 3 is a highly diagrammatic perspective view of the embodiment of FIG. 1 showing a third step of fastening the two parts together.
Figure 4:
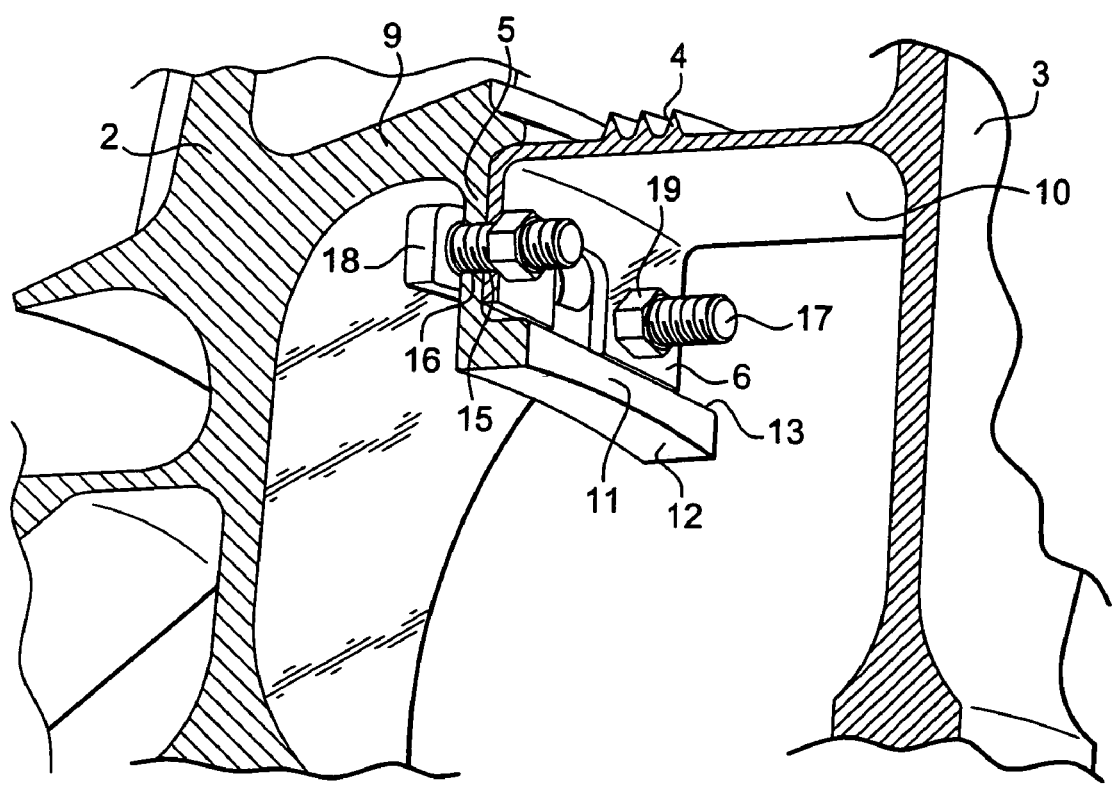
FIG. 4 is a highly diagrammatic perspective view of the embodiment of FIG. 1 showing a fourth step of fastening the two parts together.

When the element 20 is engaged between the annular flange 5 and the body of the rotor disk 2, as shown in FIGS. 2 and 3, it is disposed coaxially relative to the two annular parts 2 and 3 (FIG. 3), with its wall 23 coming into abutment against the radially inner periphery 12 of the annular flange 5. This abutment defines a position in which the screw heads 18 are engaged in the recesses 25 and are prevented from turning in said recesses. The screw heads are also prevented from moving in translation between the axial abutment 27 of each recess 25 and the annular flange 5. The abutment of the wall 23 of the element 20 against the annular flange 5 also enables the removable element 20 to be prevented from turning relative to the rotor disk 2. Engaging two screw heads 18 in the recesses 25 enables the heads to contact the bottom surfaces 28 in the recesses 35, where said bottom surfaces are substantially parallel to the plane containing the axes of the two adjacent screws 17, thereby also preventing the removable element 20 from turning. The first side wall 21 of the element 20 extends along the annular flange 5 on its side facing away from the spacer 3, and the second side wall 22 extends along the rim 11 into the vicinity of its outer cylindrical surface 13, while leaving clearance between the free end 24 of said second end 22 and the free ends 14 of the tabs 6.

Although FIGS. 1 to 4 show a single removable element 20, there are as many independent removable elements 20 distributed in a circle along the annular flange 5 as are necessary for preventing all of the screw heads 18 from moving.

The various steps in assembling together the two annular parts 2 and 3 while using the fastening device of the invention as described above are shown in succession in FIGS. 1 to 4. Initially (FIG. 1), the fastening screws 17 are engaged in the screw passages 16 of the annular flange 5 until the screw heads 18 come into contact with the flange 5. In a second step shown in FIG. 2, the removable elements 20 are brought up to the annular flange 5 by being moved in translation in substantially radial directions relative to the axis 26. For each removable element 20, movement in translation is continued until the wall 23 comes into abutment against the radially inner periphery 12 of the annular flange 5, with the screw heads 18 then being engaged in the notches 25 and thus prevented from moving both in rotation and in translation, and with the removable elements 20 being prevented from moving in translation relative to the rotor disk 2. In a third step as shown in FIG. 3, the spacer-forming annular part 3 is placed axially against the end of the rotor disk 2 so that the shanks of the screws 17 are engaged in the passages 15 in the connection tabs 6. One or more nuts 19 are then engaged on and screwed onto the threaded shank of each screw 17, after which they are tightened to the specified torque against the corresponding connection tab 6 or against a clamping washer placed between each nut 19 and the clamping tabs 6. Once the two annular parts 2 and 3 have finished being assembled together (FIG. 4), the removable elements 20 are withdrawn and can be used for assembling together two other parts.

In a variant, the two annular parts 2 and 3 are initially placed end to end and indexed angularly so that the screw passages 15, 16 in the two annular parts 2, 3 are in alignment. The screws 17 are then engaged in the aligned screw passages 15, 16. The removable elements 20 are then engaged on the screw heads 18 so as to prevent them from moving while the nuts 19 are being screwed onto the screws 17 and tightened against the connection tabs 6.

To separate the two annular parts 2, 3, the removable elements 20 can be applied against the screw heads so as to prevent them from moving during loosening and unscrewing of the nuts 18. The steps enabling the two elements 2, 3 to be separated are then shown in succession by FIGS. 4 to 1.

In a variant embodiment, the recesses 25 in the removable element 20 pass right through the thickness thereof of the side wall 21 so as to form notches extending from the free end of the side wall 21. The above-mentioned axial abutment for making contact with the screw heads is then formed by a portion of the annular part 2 for assembly.

What is claimed is:

1. A device for fastening two parts together, the device comprising:
fastening screws having heads, the fastening screws extending along aligned passages in the two parts,
a removable element having a first wall configured to fit between said two parts, said first wall defining recesses of a shape complementary to that of said heads so that, when said first wall is between said two parts, each of said heads engages in a corresponding recess of said first wall of said removable element and is prevented by said first wall from rotating inside said corresponding recess relative to said removable part,
wherein said removable element has a second wall, wherein a portion of one of said two parts engages between said first and second walls of said removable element such that said removable element is prevented from turning relative to said one of said two parts when said removable element is between said two parts, and
wherein the removable element is removable from the screw heads after the nuts have been tightened on the screws such that said removable element is not between said two parts when said two parts are fastened to each other by said screws and nuts.

2. The device according to claim 1 wherein the removable element comprises means cooperating by abutment against a portion of said one of said two parts for preventing rotation of the screw heads relative to said first part.

3. The device according to claim 1, wherein the removable element is prevented from rotating by engaging on at least two adjacent fastening screws.

4. The device according to claim 1, wherein the recesses are of a U-shape complementary to the screw heads to be prevented from rotating.

5. The device according to claim 1, wherein the removable element is of L-shape section, having one limb forming a rim and including at least one recess for engagement on a screw head, and having another limb forming an abutment against said one of said two parts when said heads are engaged in said recesses.

6. The device according to claim 5, wherein the abutment-forming limb also forms means for preventing the removable element from moving in translation.

7. The device according to claim 5, wherein the recesses open out firstly into an end surface of the rim remote from the abutment-forming limb, and secondly in a side surface of the rim in its side facing towards the abutment-forming limb.

8. The device according to claim 5, wherein the recesses are closed beside a side surface of the rim that faces away from the limb forming a positioning abutment, so as to form an axial abutment for the screw heads.

9. The device according to claim 1, wherein each recess is a notch passing through the removable element along an axis parallel to an axis of the respective fastening screw.

10. The device according to claim 1, wherein the removable element is engaged on said heads by being moved in translation perpendicularly to axes of the fastening screws.

11. The device according to claim 1, wherein the two parts are annular parts.

12. The device according to claim 11, wherein at least one of the two annular parts is a rotor disk.

13. The device according to claim 11, comprising a plurality of independent removable elements distributed around a circumference.

14. The device according to claim 1, wherein said recesses of said first wall of said removable element are closed recesses with an abutment such that, when said first wall is between said two parts, each of said heads engaged in said corresponding recess is prevented by said abutment from moving in an axial direction along said aligned passages during tightening or loosening of nuts on the screws.

* * * * *